(No Model.) 4 Sheets—Sheet 1.
D. J. SMITH & D. SINCLAIR.
TELEPHONE CHECK APPARATUS.
No. 355,226. Patented Dec. 28, 1886.
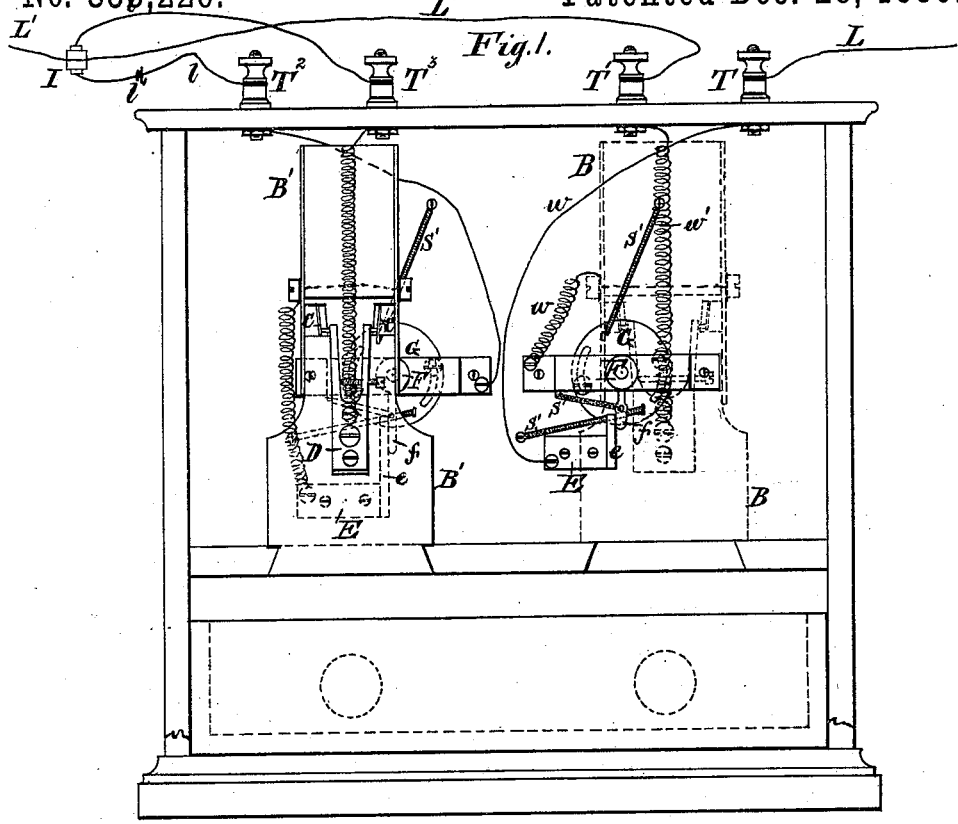
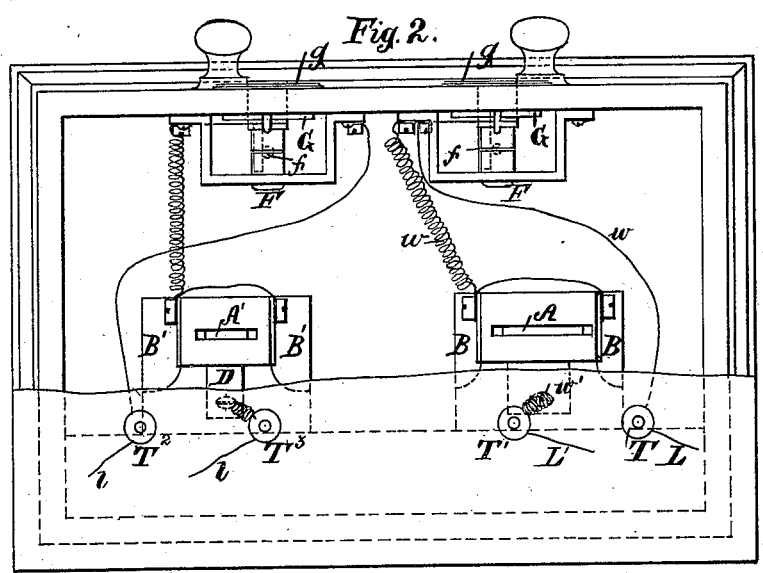
Attest:
F. A. Hopkins
Edward Steer
Inventors:
David Johnstone Smith,
Daniel Sinclair,
By Knight Bros
att'ys.

(No Model.) 4 Sheets—Sheet 2.
D. J. SMITH & D. SINCLAIR.
TELEPHONE CHECK APPARATUS.
No. 355,226. Patented Dec. 28, 1886.
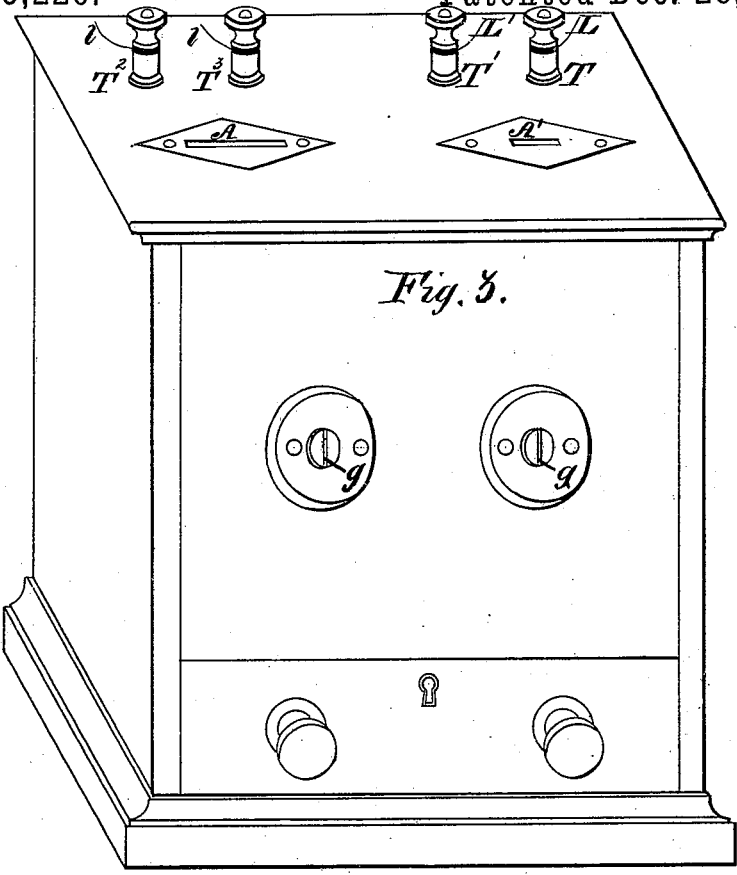
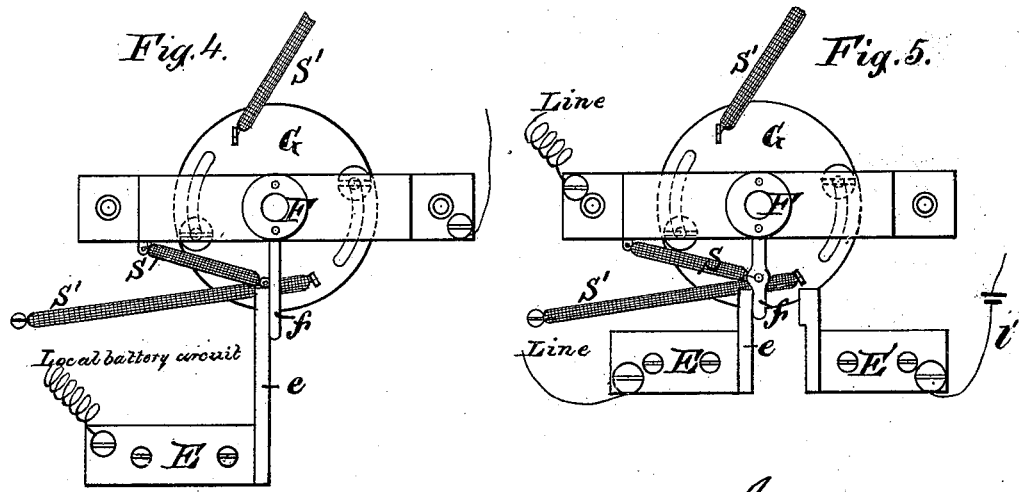

(No Model.) 4 Sheets—Sheet 3.
D. J. SMITH & D. SINCLAIR.
TELEPHONE CHECK APPARATUS.
No. 355,226. Patented Dec. 28, 1886.
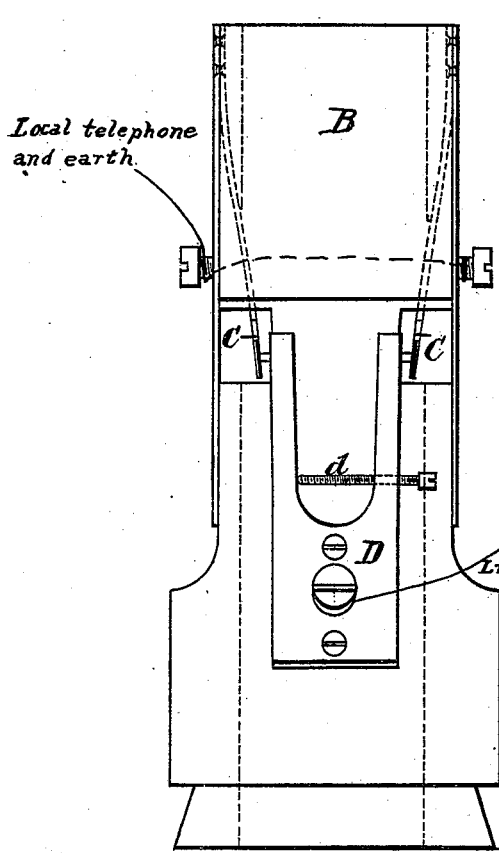
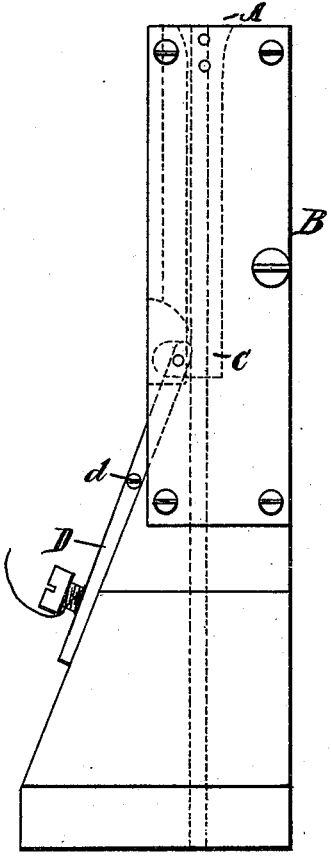
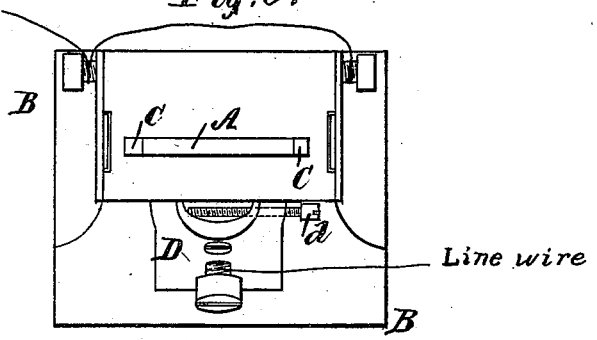
Attest:
F. A. Hopkins
Edward Stun
Inventors:
David Johnstone Smith
Daniel Sinclair
By Knight Bros.
attys.

(No Model.) 4 Sheets—Sheet 4.
D. J. SMITH & D. SINCLAIR.
TELEPHONE CHECK APPARATUS.
No. 355,226. Patented Dec. 28, 1886.
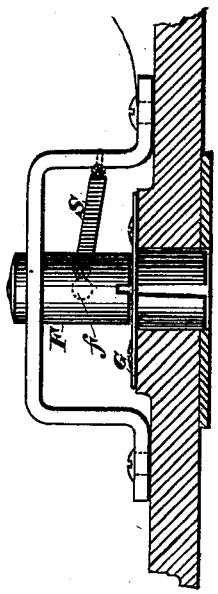
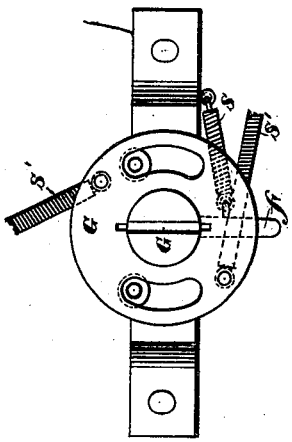

UNITED STATES PATENT OFFICE.

D. JOHNSTONE SMITH AND DANIEL SINCLAIR, OF GLASGOW, COUNTY OF LANARK, SCOTLAND.

TELEPHONE-CHECK APPARATUS.

SPECIFICATION forming part of Letters Patent No. 355,226, dated December 28, 1886.

Application filed April 27, 1886. Serial No. 200,347. (No model.) Patented in England October 21, 1885, No. 12,600.

*To all whom it may concern:*

Be it known that we, DAVID JOHNSTONE SMITH and DANIEL SINCLAIR, citizens of the United Kingdom of Great Britain and Ireland, residing at Glasgow, in the county of Lanark, Scotland, have invented new and useful Improvements in Telephone-Check Apparatus; and we do hereby declare that the following is a full, clear, and exact description of the invention, which will enable others skilled in the manufacture or art to which it relates to make and use the same.

Our invention has for its object the provision of means for enabling the operators in telephone-exchanges to check the payment of charges made for the use of telephonic communication in public call-boxes and offices connected to such exchanges, and the time during which the telephone is used on each occasion, while also permitting of the free use of the call-box telephones by subscribers to the exchange system.

Heretofore it has been usual to provide in each call-box an instrument which is brought into action to ring up the exchange by dropping through a chute and onto a balance the amount, in pence, cents, or other coin, which is charged for the right to use the telephone. A timepiece in the instrument serves to determine the length of time during which the telephone may be used, and it is arranged to cut off the connection of the call-box instrument with the exchange at the expiration of the interval allowed for conversation.

Instruments of the class referred to are very costly, are liable to get out of order, and their use is open to many objections—such, for example, as that the user of the telephone is compelled to drop into the chute the amount payable for the use of the telephone before he may ascertain whether immediate connection may be had with the subscriber with whom he desires to communicate, and that ordinary subscribers cannot have the use of the call-boxes without also making payment. We overcome these and like objections and attain the object in view by providing at each call-box (in addition to the ordinary means for calling, whereby the caller may ring up the exchange, inform the operator that he desires to use the telephone, and ascertain if he can communicate with the subscriber he wants) a check box or instrument having one, two, or more orifices or chutes for the reception of coins or tokens of different denominations, and a spring or springs, or similar means, connected to the line-wire or a local circuit, and so placed in the chutes that by the closing or breaking of the circuit, occasioned by the descent of each coin, or by the action of the subscriber's check, an audible or visible signal is communicated to the operator at the exchange.

In the accompanying drawings, which illustrate our invention, Figures 1 and 2, Sheet 1, are respectively a back elevation and a plan of the check box or instrument provided in each call-box or office, the back board and cover of the box being removed in order that the working parts of the apparatus may be clearly seen. Fig. 3, Sheet 2, is a perspective view of the exterior of the box. Figs. 4 and 5, Sheet 2, and Figs. 6, 7, and 8, Sheet 3, are detached views showing to a larger scale the details of the apparatus. Figs. 9 and 10 are respectively a side elevation and a rear view of the hub and disk with their accessories.

The improved check-box, as illustrated in Figs. 1, 2, and 3, is arranged for the collection of differential rates for the use of the telephone, one orifice, A, and chute B being provided for the insertion of coins or tokens of one denomination in payment for communication with subscribers on a local exchange, and the other orifice, A', and corresponding chute B' being provided for the reception of coins or tokens of a different denomination for communication with subscribers on a distant exchange, the operative parts of the apparatus being also in duplicate. A greater number of chutes and operating parts may, however, be employed, and when a uniform charge is made for the use of the telephone a single chute provided with checking apparatus is employed.

The checking apparatus in each chute is alike, and in the present instance consists of two springs, C C, fitted, as shown particularly in Figs. 6, 7, and 8, in the sides, to form a contracted neck, which is opened up by the coin or token in its descent, provided it be of the proper denomination, terminal points on both of said springs being thereby lifted out of contact with a conducting-bar D, which is electrically connected to the line-wire connected to the telephone-exchange. The conducting-bar D is forked at its end, and is provided with an adjusting-screw, $d$, whereby the forked ends may be pressed apart slightly, in order to so adjust the positions of the springs C C that they may not be acted on by a coin of smaller size than that which should be inserted in the chute. The two springs are connected by a conducting-wire leading to a terminal to which, in the simple arrangement of the connections as represented in Fig. 6, for cases in which a single box is used, the second telephone-wire, passing to the local telephone and thence to earth, is connected. The line-wire at the exchange passes through a call-bell or other audible or visible signaling apparatus and a battery connected to earth, and the effect of the arrangement is that when by the descent of a proper coin or token through the chute B the spring-points C are both pressed aside and out of contact with the conductor D the circuit through the telephone-wire is momentarily broken and reclosed, and thereby a sharp "click" or like sound is produced in the exchange-operator's telephone, or a movement of the hammer of the bell or other signaling apparatus at the exchange takes place, indicative of the passage of the coin through the chute.

When the apparatus is constructed as shown in Figs. 1, 2, and 3 for collection of differential rates, the springs in one chute are adjusted so that they are acted on by coins or tokens of one denomination, and those in the adjoining chute by larger or smaller coins or tokens.

The arrangement of the electrical connections when, as in the present example, provision is made for working the apparatus by the use of only one wire for connection to both chutes and to check devices for subscribers' keys is as follows: The line-wire L from the exchange is connected to one terminal, T, having a connecting-wire, $w$, through one of the check-key devices, hereinafter described, to the springs C of the check apparatus in connection with the chute B, and the circuit is completed through the bar D and wire $w'$, connected to the terminal T', to which is connected the wire L', leading to the call-box telephone and to earth, the secondary wire of the usual induction-coil, I, being in the circuit of the line L'. At the exchange a battery, a call-bell or other signaling device, and a telephone are provided in the line-circuit L. The connections of the checking apparatus of the chute B' are made in a manner similar to those of the chute B to terminals $T^2$ $T^3$, to which a wire, $l$, having in circuit a local battery, $l'$, and the primary wire of the induction-coil is connected.

The operation of the apparatus is as follows: The caller at the call-box or office rings up the exchange through the line L L' and asks the operator to connect him with the subscriber with whom he wishes to communicate, If the subscriber wanted is on the local exchange, the operator requests the caller to drop through the chute B a coin or a number of coins representing the amount payable for the use of the telephone. The coin, or each coin, as it descends through the chute toward the collecting-drawer below, presses apart the springs C C, and by breaking the circuit through the battery at the exchange causes the hammer of the call-bell there to vibrate at each interruption or breaking and making of the circuit, or produces such other audible or visible signal as will indicate to the operator that the proper payment has been made, after which the operator makes connection with the subscriber wanted through the switch-board in the usual way. If the subscriber wanted is upon a distant exchange, the operator requests the caller to drop the proper coin or token through the chute B', and when the coin in its descent breaks the circuit of the check apparatus of the chute B', which is completed through the battery $l'$, the current from said battery is momentarily interrupted in the circuit, and a corresponding interruption of the current induced through the induction-coil I in the line L L' takes place, resulting in the production in the exchange-operator's telephone of a sharp click, which is heard by the operator listening at the telephone, and indicates clearly that the proper coin has been dropped through the chute B'. The operator then makes the connection with the subscriber wanted in the usual way. At the end of the interval allowed for communication in each case the exchange operator disconnects the subscriber, unless a fresh payment is made.

To provide for the use by subscribers to the exchange system of the call-box telephone without making payment, the telephone-circuit is carried through a bracket-piece, E, provided with a contact-point, $e$, against which bears a lever-arm, $f$, actuated by a hub, F, which is electrically connected to the line, and said hub is capable of being turned by a key, with which each subscriber is provided, to lift the arm $f$ off the contact-point and momentarily break the circuit, in order that a click or other signal may be communicated to the exchange operator. As is shown in Fig. 4, the lever-arm $f$ is maintained normally in contact with the point $e$ of the bracket E by means of a spring, S. On the same center as the hub a disk, G, is carried, and has a slit, $g$, in it, through which the subscriber's key passes in entering the hub F, and said disk is also turned with the hub, but independently of it, against the power of springs S'. The object of fitting the disk on the hub-center is that fraudulent use of the telephone by non-subscribers may be avoided, the disk being capable of being turned by any flat-pointed instrument, while the hub beyond it is not acted on excepting by a proper key extending through the disk-slit. The check apparatus in connection with one of the chutes and one set of the devices operated by the subscriber's key is thus arranged to communicate one kind of signal to the exchange operator by the breaking of the circuit, and the other chute and set of devices communicate a different signal to indicate the descent of the coin through the chute, or the insertion of the subscriber's key. A like result may be attained by arranging one set of the check apparatus to act in either of the ways above described, and the other set to act upon the closing of the circuit, instead of on the breaking of the circuit. Thus, as is represented in Fig. 5, a second bracket-arm, E', may be fitted so that contact may be made on turning the hub-arm $f$ to close momentarily a local-battery circuit, $l'$, which may act through the induction-coil or otherwise on the line-circuit, whereby the desired signal is communicated to the exchange operator. The arm $f$ is kept normally in contact with the bracket E, (which is in the line circuit,) in order that communication with the exchange may be had before sending the signal by the use of the subscriber's key. The spring, in connection with one of the chutes, may obviously be arranged to act in like manner by closing the circuit, instead of opening it, to transmit the desired signal.

Having now described the invention, what we desire to claim, and secure by Letters Patent, is—

1. The herein-described telephone check apparatus for call-boxes or offices, consisting of a box having in it two chutes provided each with a spring or springs or other contact devices so fitted as to be acted on by coins or tokens passing through the chutes, one set of contact devices being in the line-circuit connected to the exchange and the other in a local-battery circuit, so that signals of different kinds may be automatically transmitted to the exchange by the passage of the coins through the respective chutes, contact making or breaking devices in the respective circuits, and operated by suitable keys, being provided for the use of subscribers to the exchange system, substantially as and for the purposes set forth.

2. In telephone-check apparatus for call-boxes or offices, the combination of two or more chutes provided with springs or other contact devices, one set of contact devices being in a circuit through a local battery, and the primary of an induction-coil whose secondary wire is in the line or main circuit, and the second set of contact devices being in the line-circuit in which a call-bell or other signaling apparatus is provided at the exchange, substantially as and for the purpose set forth.

3. In telephone-check apparatus for call-boxes or offices, the combination, with a chute for the reception of coins or tokens, of a spring or springs adapted to be acted on thereby and connected to a line wire or circuit having in it suitable signaling apparatus, whereby the breaking or closing of the circuit by the passage of the proper coin through the chute communicates a prearranged signal to the exchange, substantially as herein set forth.

4. In telephone-check apparatus for call-boxes or offices, the combination, with a chute for the reception of coins or tokens, of a spring or springs adapted to be acted on thereby, and a local-battery circuit connected to said spring or springs and to the induction-coil in the line-circuit, whereby the passage of a proper coin through the chute produces an audible signal in the exchange-telephone, substantially as herein set forth.

5. In a telephone-check apparatus, the combination, with a line-wire having in circuit signaling apparatus at the exchange, and contact making or breaking devices, such as the springs C, adapted for being operated on by coins, keys, or the like in a call-box instrument, of a local-battery circuit acting on said line-circuit through an induction-coil, and having in the circuit a separate set of contact making or breaking devices of a like kind, substantially as and for the purpose set forth.

6. In a call-box instrument provided with means for receiving and indicating to the exchange the reception of money paid for the use of the telephone, contact making or breaking devices—such as the terminal bracket E and hub F, with its arm $f$—operated by the subscribers' keys and fitted in connection with the line and the signaling arrangements of the money-check apparatus, substantially as herein set forth.

7. In telephone-check apparatus of the class hereinbefore described, the combination of two springs forming the sides of a chute for the reception of coins or tokens, and a bifurcated conductor provided with a screw or similar device for adjusting the position of the springs so that both springs are lifted out of contact with the conductor on the passage of a coin or token of the proper denomination, and one or both remain in contact with said conductor on the passage of a smaller coin or token, substantially as herein set forth.

8. In telephone-check apparatus of the class hereinbefore described, the combination of the disk G and slitted hub F, having an arm, $f$, thereon adapted to make or break contact with a stationary bracket or terminal in the circuit, as and for the purpose set forth.

In witness whereof we have hereunto set our hands this 17th day of December, 1885.

D. JOHNSTONE SMITH.
D. SINCLAIR.

Witnesses:
HUGH FITZPATRICK,
    135 *Buchanan Street, Glasgow.*
JOHN WM. EWING,
    75 *West Nile Street, Glasgow.*